(12) United States Patent
Lee

(10) Patent No.: US 9,128,671 B2
(45) Date of Patent: Sep. 8, 2015

(54) DOCKING DEVICE

(71) Applicant: Hewlett-Packard Development Company, L.P., Houston, TX (US)

(72) Inventor: Chien-Kuo Lee, Taipei (TW)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 217 days.

(21) Appl. No.: 13/788,118

(22) Filed: Mar. 7, 2013

(65) Prior Publication Data

US 2014/0254088 A1    Sep. 11, 2014

(51) Int. Cl.
*G06F 1/16* (2006.01)
*G06F 3/042* (2006.01)

(52) U.S. Cl.
CPC ............ *G06F 1/1632* (2013.01); *G06F 1/1673* (2013.01); *G06F 3/0426* (2013.01)

(58) Field of Classification Search
CPC ..... G06F 3/016; G06F 3/0488; G06F 1/1626; G06F 1/16; G06F 1/1616; G06F 1/1635; G06F 1/1637; G06F 1/1652; G06F 1/1654; G06F 1/1679; G06F 1/1683; G06F 1/1684; G06F 1/1632; G06F 3/0416; G06F 1/1669; G06F 3/0202; G06F 1/1662; G06F 1/1673; G06F 2203/04805; G06F 1/1622; G06F 1/1671; G06F 21/83; G06F 2203/04104; G06F 3/0426; H05K 5/0017; H05K 5/02; H05K 7/00

USPC ............ 361/679.01, 679.02, 679.09, 679.21, 361/679.26, 679.27, 679.41, 679.29, 361/679.08, 679.4; 710/303–305
See application file for complete search history.

(56) References Cited

U.S. PATENT DOCUMENTS

| | | | |
|---|---|---|---|
| 8,264,828 B2 * | 9/2012 | Chang et al. ............. | 361/679.28 |
| 8,537,533 B2 * | 9/2013 | Sung ........................ | 361/679.28 |
| 2002/0021287 A1 | 2/2002 | Tomasi et al. | |
| 2003/0165048 A1 | 9/2003 | Bamji et al. | |
| 2012/0194448 A1 * | 8/2012 | Rothkopf ...................... | 345/173 |

FOREIGN PATENT DOCUMENTS

FR       2898315 A1    9/2007

OTHER PUBLICATIONS

Fault, et al.; "HumanToolz Stand: The Most Versatile iPad Stand", < http://www.kickstarter.com/projects/583843534/humantoolz-stand-the-most-versatile-stand-for-ipad >, Sep. 9, 2012.
Shein; "MSI Introduces a Win 7 Tablet with an Integrated Projector", < http://technologer.net/2011/01/23/msi-introduces-a-win-7-tablet-with-an-integrated-projector/ >, Jan. 23, 2011.

* cited by examiner

Primary Examiner — Anthony Haughton
Assistant Examiner — Ingrid Wright
(74) Attorney, Agent, or Firm — Hewlett-Packard Patent Department

(57) ABSTRACT

The disclosure relates to a docking device and an assembly comprising the docking device and a tablet computer. The docking device comprises a pair of frame members defining receiving space for receiving the tablet computer, each frame member includes a connection portion and a supporting portion; and a virtual input device pivotably mounted within an opening between the connection portions.

18 Claims, 4 Drawing Sheets

DOCKING DEVICE

BACKGROUND

With increasing development of science and technology, a tablet computer has been introduced into the market. The tablet computer is a mobile computer and often integrated into a flat, tablet screen, and may be primarily operated by touching the tablet screen. In a tablet computer, the processor may be part of the tablet screen. The tablet computer usually provides a user interface with the processor through the tablet screen. Via the tablet screen, the use may input an instruction into the tablet computer to control operations of the tablet computer. Generally, when the user wants to input a character or a symbol into the tablet computer, an on-screen keyboard is enabled and shown on the tablet screen of the tablet computer. The on-screen keyboard is a virtual keyboard simulating the real keyboard device. By touching an icon of the on-screen keyboard, a corresponding character or symbol is inputted into the tablet computer.

DESCRIPTION OF DRAWINGS

Examples of the present disclosure are described in the following description with reference to the figures. In the figures, identical and similar structures, elements or parts thereof are labeled with the same or similar references. Referring to the attached figures.

DESCRIPTION OF THE EMBODIMENTS

Figure 1:
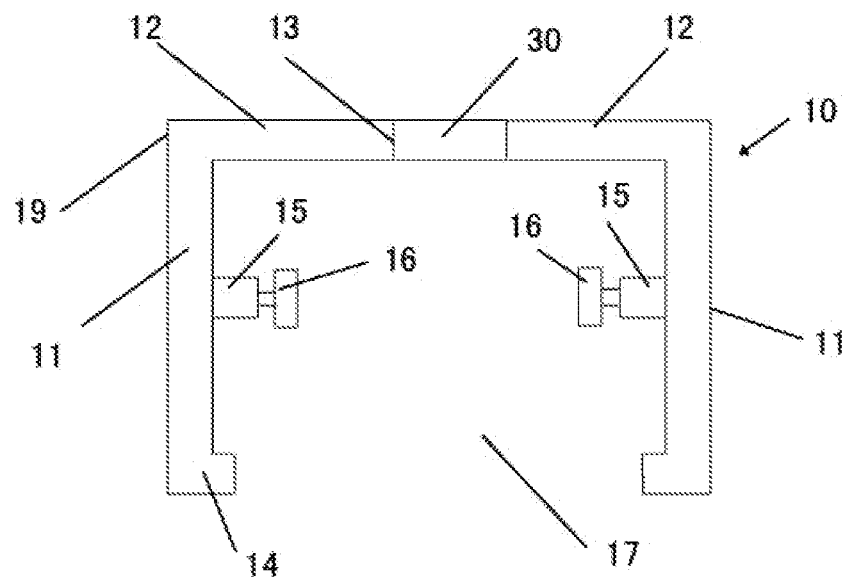
FIG. 1 is a schematic view of a docking device, integrated with a virtual keyboard device according to an example of the present disclosure.

As used herein, directional terms, such as "up", "down", "front", "rear", "leading", "trailing", "transverse" etc., are used with reference to the orientation of the figures being described. Because components of various examples disclosed herein can be positioned in a number of different orientations, the directional terminology is used for illustrative purposes only, and is not intended to be limiting. It is also to be understood that the examples illustrated in the drawings, and the specific language used herein to describe the same are not intended to limit the scope of the disclosure. Alterations and further modifications of the features illustrated herein, and additional applications of the principles illustrated herein are to be considered to fall within the scope of the disclosure.

In the existing tablet computers, since the tablet computer is light and portable, the tablet screen is often small. Thus, the on-screen keyboard is also small, and not very convenient for a user to input. In addition, if the user touches the tablet screen of the tablet computer docked in a docking device or storage device, it also causes stability problem.

According to an example of the disclosure, a docking device for a tablet computer is provided, comprising: a pair of frame members defining a receiving space for receiving the tablet computer, each frame member includes a connection portion and a supporting portion; and a virtual input device pivotably mounted within an opening between the connection portions.

The virtual keyboard device can project an image of the desired virtual keyboard in front of a user of the tablet computer, and can sense user interaction with the virtual keyboard, thus facilitating the user to input and avoiding stability problem.

Figure 3:
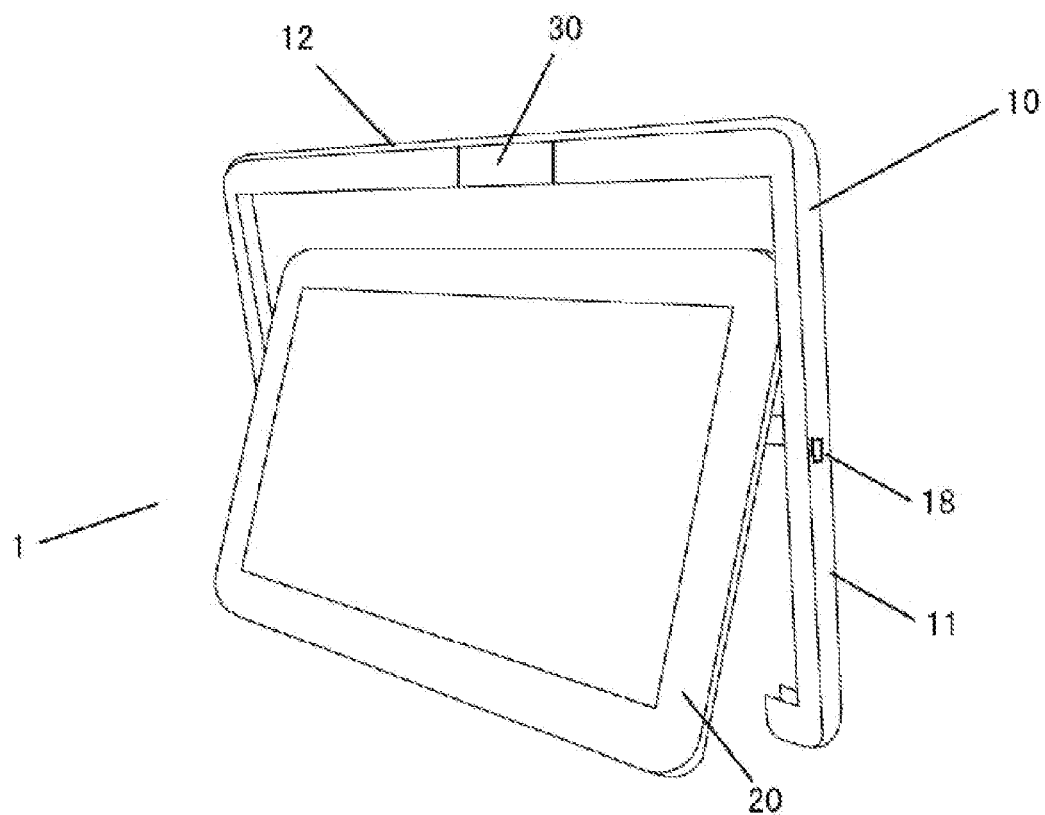
FIG. 3 is a schematic view of an assembly including a tablet computer and a docking device according to an example of the present disclosure, wherein the assembly is at a standing user position.

FIG. 1 is a schematic view of a docking device 10 integrated with a virtual keyboard device 30 according to an example of the present disclosure. The docking device 10 includes a pair of frame members 19 defining a receiving space 17 for receiving the tablet computer 20. In an example, each frame member 19 includes a connection portion 12 and a supporting portion 11 which supports the docking device 10 on a table and is provided with a hinge 15 and a connector 16. The connection portions 12 define an opening 13 therebetween. In an example, at least one of the supporting portions 11 includes at least one I/O port 18 (as shown in FIG. 3). In an example, each of the supporting portions 11 includes a transverse extension 14, so as to provide stable support. In an example, each frame member 19 is substantially L-shaped.

The docking device 10 further includes a virtual keyboard device 30 pivotably mounted within the opening 13 of the connection portion 12. In an example, the virtual keyboard device 30 is mounted to the connection portions 12 via binges (not shown).

Figure 2:
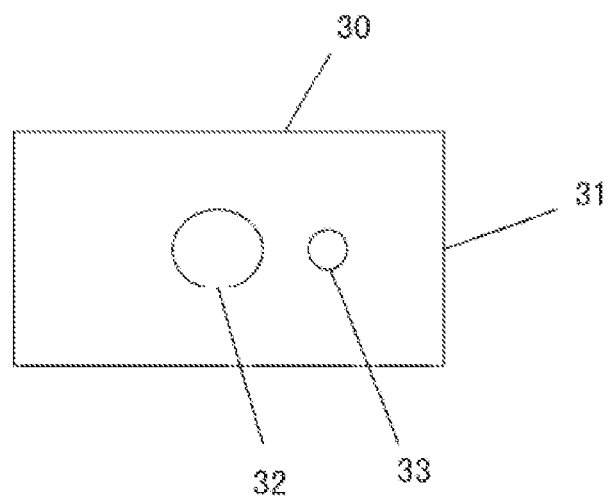
FIG. 2 is an enlarged view of a virtual keyboard device according to an example of the present disclosure.

FIG. 2 is an enlarged view of a virtual keyboard device 30 according to an example of the present disclosure. The virtual keyboard device 30 comprises a housing 31, and a virtual keyboard module (not shown) enclosed in the housing 31.

Figure 5:
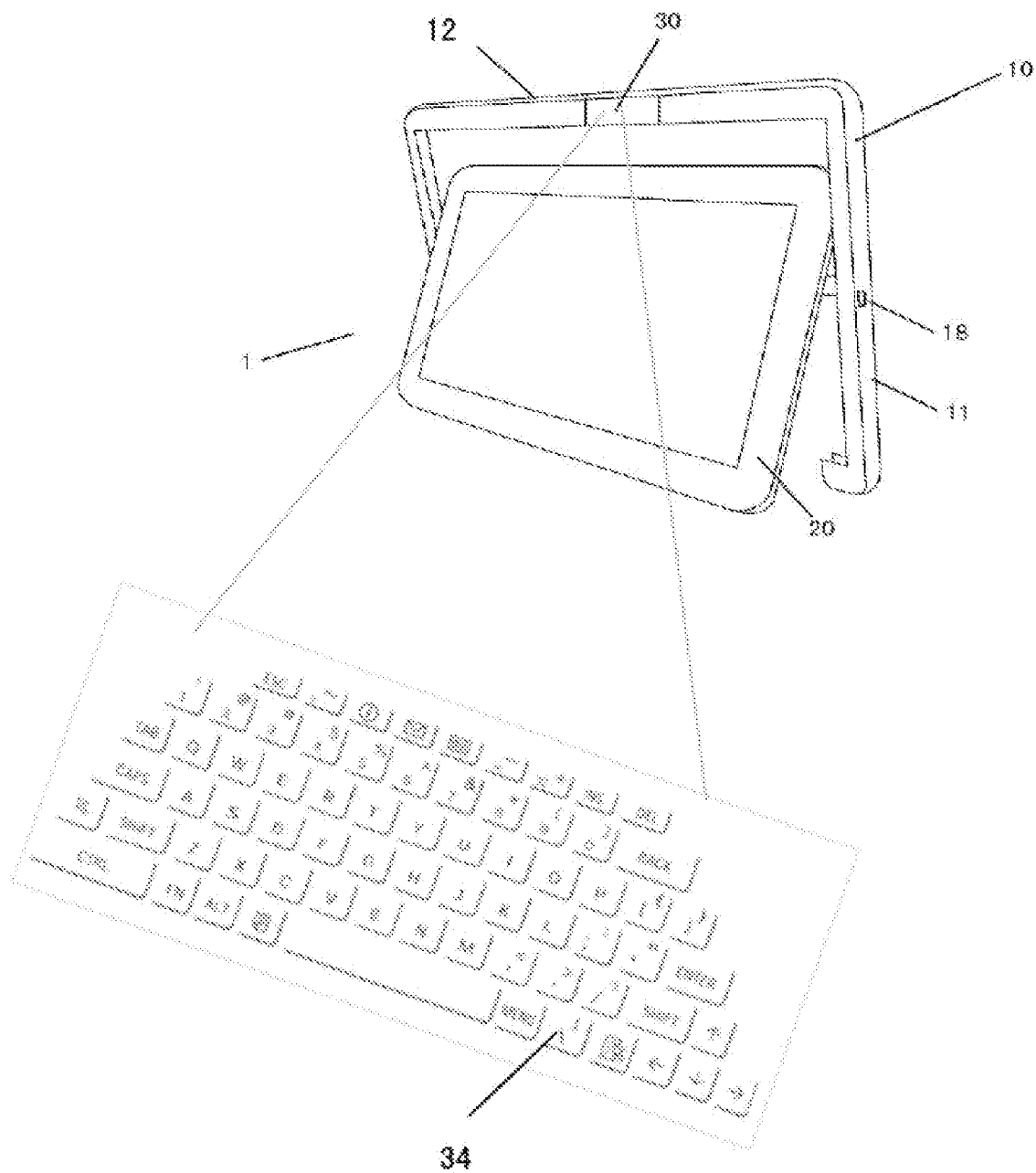
FIG. 5 is a schematic view of a virtual keyboard layout generated by the docking device according to an example of the present disclosure.

As shown in FIG. 2, the housing 31 may define a projection hole 32 and a sensor hole 33, and the virtual keyboard module includes a projector element (not shown) aligned with the projection hole 32, a sensor element (not shown) aligned with the sensor hole 33, and a processor (not shown). The projector element is shown to include a keyboard projector or projection system, which in an example, is configured to project a keyboard image 34 to an input area in front of the tablet computer 20 and proximate to a user, such that, a user can input data into the tablet computer 20. In an example, the projector element can project a virtual image of a keyboard 34 in front of the tablet computer 20. In an example, the projector element includes a laser diode or diode laser and a diffractive optical element, for projecting an image of the desired keyboard interface 34 in front of a user of the tablet computer, as shown in FIG. 5. Further, the sensor element is mounted within the housing 31 and is aligned with the sensor hole 33. The sensor element is configured to sense user interaction with the virtual keyboard 34 that is projected in front of a user. In an example, the sensor element comprises a CMOS (Complimentary Metal-Oxide Semiconductor) camera and a sensor chip.

Figure 4:
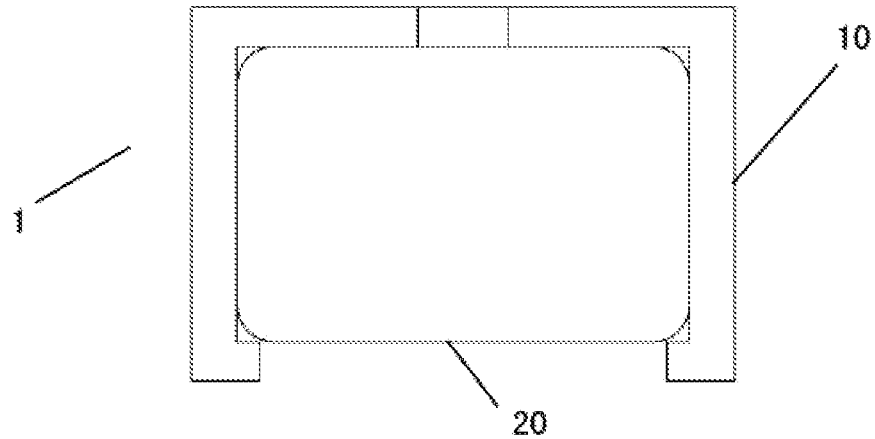
FIG. 4 is a schematic view of tan assembly including a tablet computer and a docking device according to an example of the present disclosure, wherein the assembly is at a storage position.

FIG. 3 is a schematic view of an assembly 1 including a tablet computer 20 and a docking device 10 according to an example of the present disclosure, wherein the assembly is at a standing user position. FIG. 4 is a schematic view of an assembly 1 including a tablet computer 20 and a docking device 10 according to an example of the present disclosure, wherein the assembly is at a storage position.

As shown in FIG. 1, the docking device 10 is provided with a hinge 15 and connector 16 on respective supporting portions 11. The hinges 15 are used to pivotably connect the tablet computer 20 to the docking device 10.

As shown in FIG. 3 and FIG. 4, the assembly includes a docking device 10 and a tablet computer 20 received in the receiving space 17 of the frame members 19 and pivotally connected to the supporting portion 11 via the hinge 15. FIG. 3 shows that the assembly is located at the standing user position. When the assembly is located at the storage position shown in FIG. 4, the tablet computer 20 rotates via the hinges 15 to be placed in the plane defined by the frame members 19, so that the tablet computer 20 can be stored in it space saving manner.

The tablet computer 20 includes a plurality of electronic components, comprising at least one processor, at least one memory, and at least one power supply unit.

FIG. 5 is a schematic view of a virtual keyboard layout 34 generated by the docking device 10 according to an example of the present disclosure. The virtual keyboard 34 shown in FIG. 5 is only an example, and is not intended to limit the scope of the disclosure.

Figure 6:
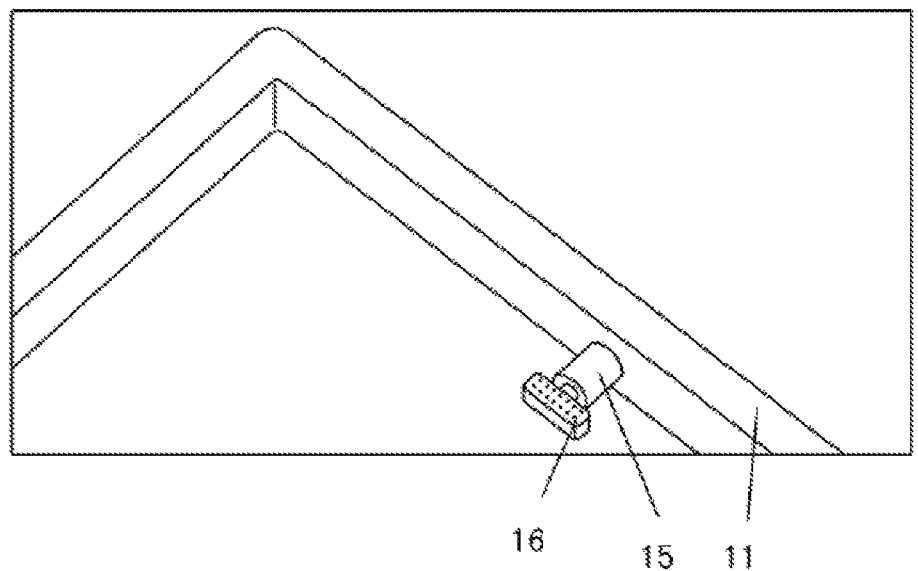
FIG. 6 is a schematic perspective view of a portion of the docking device according to an example of the present disclosure.

FIG. 6 is a schematic perspective view of a portion of the docking device 10 according to an example of the present disclosure. As shown in FIG. 6, each supporting portion 11 is provided with a hinge 15 and a connector 16. Cables (not shown) pass through the hinges 15 and the supporting portions 11, thereby providing communication between the virtual keyboard device 30 and the connectors 16. In an example, the connectors 16 are substantially rectangular in cross-section shape, and fit within corresponding interface ports (not shown) of the tablet computer 20 for providing locking function.

Having described an example of the docking device of the present disclosure, and in particular the docking device integrated with the virtual keyboard device, it should be apparent to those skilled in the art that the disclosure may be modified in both arrangement and detail.

Although specific examples have been illustrated and described herein, it will be appreciated by those of ordinary skill in the art that a variety of alternate and/or equivalent implementations may be substituted for the specific examples shown and described without departing from the scope of the present disclosure. This application, is intended to cover any adaptations or variations of the specific examples discussed herein. Therefore, it is intended that this disclosure be limited only by the claims and the equivalents thereof.

The invention claimed is:

1. A docking device for a tablet computer, comprising:
a pair of frame members defining a receiving space for receiving the tablet computer, each frame member includes a connection portion and a supporting portion;
a hinge connected to one of the supporting portions, wherein the hinge extends into the receiving space defined by the pair of frame members;
a connector connected to the hinge, wherein the connector is to connect to the tablet computer such that the tablet computer is to be hingedly connected to the frame member; and
a virtual input device pivotably mounted within an opening between the connection portions, wherein the virtual input device includes a projector element to project a virtual keyboard.

2. The docking device of claim 1, wherein the connector is an electrical connector through which electrical signals are to be communicated, and wherein the frame members are provided with cables for providing communication between the virtual input device and the table computer through the connector.

3. The docking device of claim 1, wherein at least one of the frame members includes at least one I/O port positioned on a section of the frame that is outside of the receiving space defined by the pair of frame members.

4. The docking device of claim 1, wherein the virtual input device is a virtual keyboard device which comprises a housing, and a virtual keyboard module enclosed in the housing.

5. The docking device of claim 4, wherein the housing includes a projection hole and a sensor hole, and the virtual keyboard module includes the projector element aligned with the projection hole to project the virtual keyboard, a sensor element aligned with the sensor hole to sense interactions with the virtual keyboard, and a processor.

6. The docking device of claim 1, wherein each frame member is substantially L-shaped.

7. A docking device which comprises for a computer comprising:
a pair of frame members defining a receiving space for receiving the computer, each frame member includes a connection portion and a supporting portion, wherein the connection portions are attached to each other with an opening provided between the connection portions;
a pair of hinges, wherein each of the hinges is connected to one of the supporting portions and extends into the receiving space;
a pair of connectors, wherein each of the connectors is connected to one of the hinges and is to connect to the tablet computer such that the computer is to be hingedly connected to the frame member; and
a virtual keyboard device mounted within the opening between the connection portions, wherein the virtual keyboard device is to project a virtual keyboard, to detect interactions by a user with the virtual keyboard, and to communicate signals corresponding to the detected interactions to the computer.

8. The docking device of claim 7, wherein the at least one of the connectors is an electrical connector that is to mate with an interface port on the computer.

9. The docking device of claim 8, wherein at least one of the frame members includes at least one I/O port, wherein the at least one I/O port is electrically connected to the at least one connector that is an electrical connector.

10. The docking device of claim 7, wherein the virtual keyboard device comprises a housing, and a virtual keyboard module enclosed in the housing.

11. The docking device of claim 10, wherein the housing includes a projection hole and a sensor hole, and the virtual keyboard module includes a projector element aligned with the projection hole, a sensor element aligned with the sensor hole, and a processor.

12. The docking device of claim 7, wherein each frame member is substantially L-shaped.

13. The docking device of claim 7, wherein the computer includes a plurality of electronic components, comprising at least one processor, at least one memory, and at least one power supply unit, and wherein the computer is to be rotated with respect to the docking device via the hinges such that the computer is to be moved between a standing user position and a storage position through rotation of the hinges.

14. A docking device for a computer, comprising:
a pair of frame members that define a receiving space for receiving the computer, and an opening;
a virtual input device mounted within the opening, wherein the virtual input device is to project a virtual keyboard, to detect interactions by a user with the virtual keyboard, to convert the detected interactions into signals, and to communicate the signals to the computer;

a pair of hinges, wherein each of hinges is connected to one of the frame members and extends into the receiving space, and wherein each of the hinges has a first position and a second position; and a connector connected to one of the hinges, wherein the connector is to connect to the computer, and wherein the computer is to be held in a first position when the hinges are in the first position and the computer is to be held in a second position when the hinges are in the second position.

15. The docking device of claim 14, wherein the virtual input device is electrically connected to the connector, wherein the connector is to be electrically connected to the computer, and wherein the signals are to be communicated from the virtual input device to the computer through the connector.

16. The docking device of claim 14, further comprising at least one I/O port provided on one of the pair of frame members, wherein at least one I/O port is wired to the connector.

17. The docking device of claim 14, wherein the virtual input device is a virtual keyboard device which comprises a housing, and a virtual keyboard module enclosed in the housing.

18. The docking device of claim 17, wherein the housing includes a projection hole and a sensor hole, and the virtual keyboard module includes a projector element aligned with the projection hole to project the virtual keyboard, a sensor element aligned with the sensor hole to detect the interactions by the user, and a processor to convert the detected interactions into signals.

* * * * *